United States Patent
Maslov et al.

(10) Patent No.: US 6,791,222 B1
(45) Date of Patent: Sep. 14, 2004

(54) ROTARY ELECTRIC MOTOR HAVING AT LEAST TWO AXIALLY AIR GAPS SEPARATING STATOR AND ROTOR SEGMENTS

(75) Inventors: Boris A. Maslov, Reston, VA (US); Alexander V. Pyntikov, Ashburn, VA (US)

(73) Assignee: Wavecrest Laboratories, LLC, Dulles, VA (US)

( * ) Notice: Subject to any disclaimer, the term of this patent is extended or adjusted under 35 U.S.C. 154(b) by 127 days.

(21) Appl. No.: 10/134,365

(22) Filed: Apr. 30, 2002

(51) Int. Cl.$^7$ .......................... H02K 21/12; H02K 1/12
(52) U.S. Cl. .................. 310/156.38; 310/216; 310/266
(58) Field of Search ............................. 310/67 R, 75 R, 310/68 R, 268, 254, 216, 218, 166, 168, 259, 112, 265–267

(56) References Cited

U.S. PATENT DOCUMENTS

| | | | |
|---|---|---|---|
| 4,761,590 A | 8/1988 | Kaszman | |
| 4,786,834 A | 11/1988 | Grant et al. | 310/194 |
| 4,864,176 A * | 9/1989 | Miller et al. | 310/194 |
| 4,866,321 A | 9/1989 | Blanchard et al. | |
| 5,625,241 A * | 4/1997 | Ewing et al. | 310/156.37 |
| 5,786,645 A * | 7/1998 | Obidniak | 310/68 R |
| 5,894,902 A * | 4/1999 | Cho | 180/65.5 |
| 5,952,756 A | 9/1999 | Hsu et al. | |
| 6,323,576 B1 * | 11/2001 | Applegate | 310/268 |
| 6,346,759 B1 * | 2/2002 | Suzuki et al. | 310/254 |
| 6,617,746 B1 * | 9/2003 | Maslov et al. | 310/254 |

FOREIGN PATENT DOCUMENTS

| | | |
|---|---|---|
| EP | 0 896 415 | 2/1999 |
| WO | WO 00/48294 | 8/2000 |

* cited by examiner

Primary Examiner—Tran N. Nguyen
(74) Attorney, Agent, or Firm—McDermott Will & Emery LLP (57) ABSTRACT

A motor has a rotor and a stator. The stator is made up of a plurality of separate electromagnet core segments disposed coaxially about an axis of rotation. The core segments are affixed, without ferromagnetic contact with each other, to a non-ferromagnetic support structure. The rotor is configured in an annular ring that at least partially surrounds the annular stator to define two parallel axial air gaps between the rotor and stator respectively on opposite axial sides of the stator. Permanent magnets are distributed on each side of the rotor annular ring that faces an air gap. Preferably, each stator electromagnet core segment has a pair of poles aligned in a direction generally parallel to the axis of rotation with pole faces generally perpendicular to the axis of rotation. A winding is formed on a core portion that links the poles to produce, when energized, magnetic poles of opposite polarity at the pole faces.

12 Claims, 6 Drawing Sheets

ROTARY ELECTRIC MOTOR HAVING AT LEAST TWO AXIALLY AIR GAPS SEPARATING STATOR AND ROTOR SEGMENTS

RELATED APPLICATIONS

This application contains subject matter related to copending U.S. application Ser. No. 09/826,423 of Maslov et al., filed Apr. 5, 2001, copending U.S. application Ser. No. 09/826,422 of Maslov et al., filed Apr. 5, 2001, U.S. application Ser. No. 09/966,101 of Maslov et al., filed Oct. 1, 2001, and U.S. application Ser. No. 10/067,305, of Maslov et al., filed Feb. 7, 2002, all commonly assigned with the present application. The disclosures of these applications are incorporated by reference herein.

FIELD OF THE INVENTION

The present invention relates to rotary electric motors, more particularly to motors having a plurality of permanent magnet rotor elements and magnetically isolated stator elements with a plurality of air gaps between the stator and rotor elements.

BACKGROUND

The progressive improvement of electronic systems, such as microcontroller and microprocessor based applications for the control of motors, as well as the availability of improved portable power sources, has made the development of more efficient electric motor drives a compelling challenge. Electronically controlled pulsed energization of windings of motors offers the prospect of more flexible management of motor characteristics. By control of pulse width, duty cycle, and switched application of a battery source to appropriate stator windings, functional versatility that is virtually indistinguishable from alternating current synchronous motor operation can be achieved. The use of permanent magnets in conjunction with such windings is advantageous in limiting current consumption.

The above-identified copending related U.S. patent application of Maslov et al., Ser. No. 09/826,423, identifies and addresses the need for an improved motor amenable to simplified manufacture and capable of efficient and flexible operating characteristics. It is highly desirable to attain smooth operation over a wide speed range, while maintaining a high torque output capability at minimum power consumption. The copending related U.S. applications incorporate electromagnet poles as isolated magnetically permeable structures configured in an annular ring, relatively thin in the radial direction, to provide advantageous effects. With this arrangement, flux can be concentrated, with virtually no loss or deleterious transformer interference effects in the electromagnet cores, as compared with prior art embodiments. While improvements in torque characteristics and efficiency are attainable with the structure of the identified copending application, further improvements remain desirable.

The Maslov et al. applications recognize that isolation of the electromagnet groups permits individual concentration of flux in the magnetic cores of the groups, with low flux loss and no deleterious transformer interference effects with other electromagnet members. Operational advantages can be gained by configuring a single pole pair as an isolated electromagnet group. Magnetic path isolation of the individual pole pair from other pole groups eliminates a flux transformer effect on an adjacent group when the energization of the pole pair windings is switched.

Copending related U.S. patent application of Maslov et al., Ser. No. 09/966,101 describes benefits to be gained from utilization of three dimensional aspects of motor structure. Advantages are recognized from the use of materials such as a soft magnetically permeable medium that is amenable to formation of a variety of particular shapes. For example, core material may be manufactured from soft magnet grades of Fe, SiFe, SiFeCo, SiFeP powder material, each of which has a unique power loss, permeability and saturation level. Core geometries and core dimensions of stator elements, with relevant tolerances, can be formed without the need to form laminations and thus optimize the magnetic potential gradient developed between coupled poles of rotor permanent magnets and stator electromagnets. A structural configuration is disclosed wherein axially aligned stator poles and axially aligned rotor magnets provide highly concentrated flux distribution. Such configuration provides a greater number of poles with the same individual active air gap surface areas and/or greater total active air gap surface area than conventional motors having the same air gap diameter.

In summary, concentration of flux, maximization of flux, minimization of flux loss and transformer interference effects, are all contributing factors in the attainment of efficient motor operation with high torque capability. Motor structural configurations in which multiple poles are in axial alignment to provide efficient operation at high torque output have been described in the above-identified copending applications. Such arrangements, due to the relatively great volume occupied by the large number of stator core elements and rotor poles, are advantageous for use in environments in which space and weight considerations are not at a premium. There is a continuing need for motor structural configurations that provide these improved attributes as well as economy of size and geometry.

DISCLOSURE OF THE INVENTION

The present invention furthers the above-described needs of the prior art and provides additional advantages for configurations such as the isolated individual pole pair arrangements disclosed in the above identified Maslov et al. applications. Advantages of the present invention are achieved, at least in part, by further development of motor structural configurations to increase the surface areas of opposing stator poles and rotor poles across a plurality of air gaps. The relatively larger surfaces in which flux can be concentrated promote high torque capacity.

The structural features of one such configuration of the invention are embodied in a motor that comprises a rotor and a stator comprising a plurality of separate electromagnet core segments disposed coaxially about an axis of rotation. The stator core segments form an annular stator ring bounded by an inner and outer diameter. The core segments are affixed, without ferromagnetic contact with each other, to a non-ferromagnetic support structure. The rotor is configured in an annular ring that at least partially surrounds the annular stator to define two parallel axial air gaps between the rotor and stator respectively on opposite axial sides of the stator. Permanent magnets are distributed on each side of the rotor annular ring that faces an air gap. Each stator electromagnet core segment comprises a pair of poles aligned in a direction generally parallel to the axis of rotation with pole faces generally perpendicular to the axis of rotation. A winding is formed on a core portion that links the poles to produce, when energized, magnetic poles of opposite polarity at the pole faces. A change in the direction of current effects a reversal of the magnetic polarities.

In a preferred embodiment, the rotor annular ring has a U-shaped cross section with two side portions formed of ferromagnetic material connected by a cross portion. The cross portion may also be formed of ferromagnetic material. The permanent magnets are spaced from each other and distributed along the inner surfaces of the side portions. The cross portion of the rotor is radially separated from the outer diameter of the stator. Each relatively flat permanent magnet is a magnetic dipole having one magnetic polarity at its surface facing the air gap and the opposite magnetic polarity at its surface mounted to the side portion. The permanent magnets thus have magnetic polar orientation in the axial direction. The permanent magnets on each side portion successively alternate in polarity along the rotor ring and are separated from direct contact with each other. The number of permanent magnets on the two side portions are equal to each other and are respectively in axial alignment with each other with opposite magnetic polarities to permit appropriate motor drive interaction with oppositely magnetized stator pole pair faces.

Flux distribution can be improved even further by providing additional permanent magnets mounted on the side portions in the spaces between the adjacent axially oriented permanent magnets. The thickness dimension of the additional magnets in the radial direction may be of the same order as the motor drive permanent magnets. The magnetic polar orientations of the additional permanent magnets are in directions perpendicular to the axial direction. The effect of the additional magnets is to concentrate flux through the paths of the drive magnets, thus minimizing stray flux while decreasing the size of the back iron.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
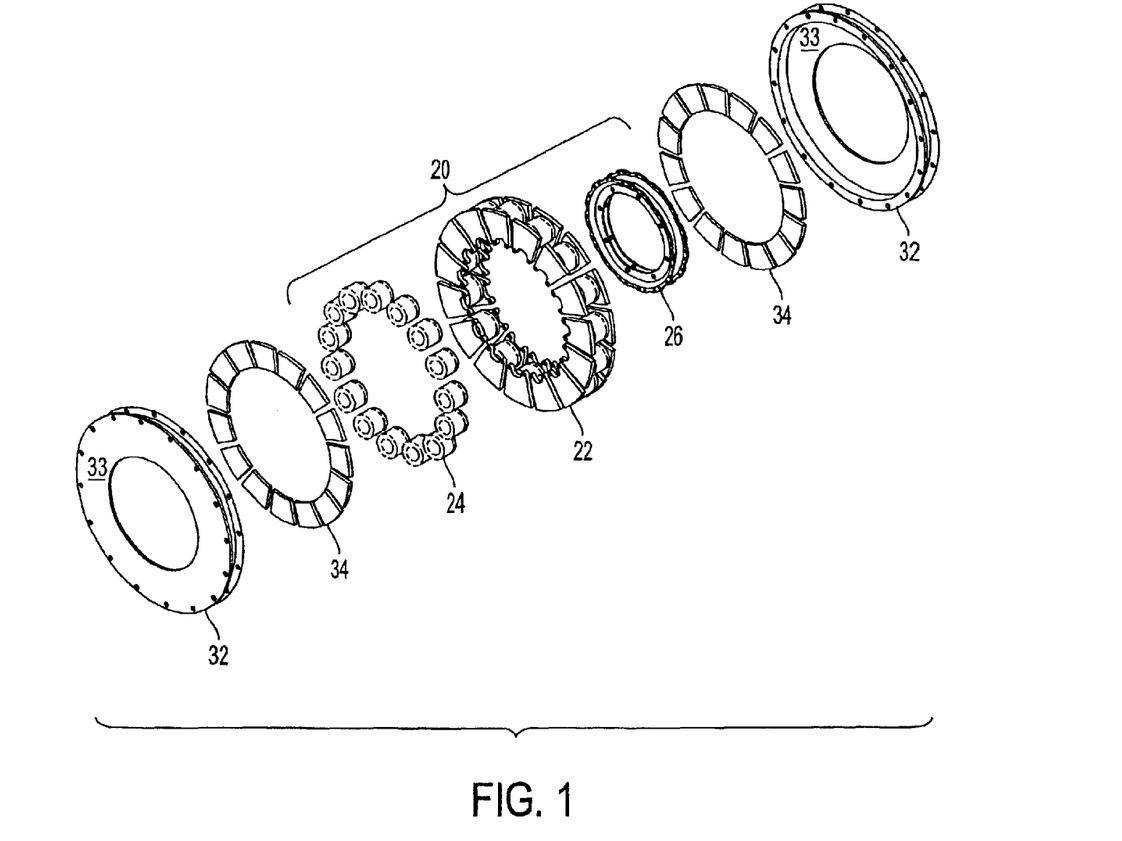
FIG. 1 is an exploded view illustrating motor components of the present invention.

FIG. 1 is a three-dimensional exploded view illustrating components of the invention. The components in combination form the assembled motor construction illustrated in FIG. 2. For simplicity of explanation, elements that are not necessary for understanding the present invention have not been illustrated. Reference is made to the aforementioned copending applications for a more detailed description of such features. The elements indicated by bracket 20, when assembled, form a stator annular ring that is centered about an axis of rotation. The stator ring comprises a plurality of ferromagnetically isolated electromagnets having core portions 22 upon which are to be formed windings 24. Non-ferromagnetic ring 26 is a support structure for the individual electromagnets. A more detailed illustration of the stator ring construction is provided in FIG. 4. The rotor comprises two end sections 32 and permanent magnets 34 which, when assembled, form an annular ring centered about the axis of rotation that at least partially surrounds the stator ring.

Figure 2:
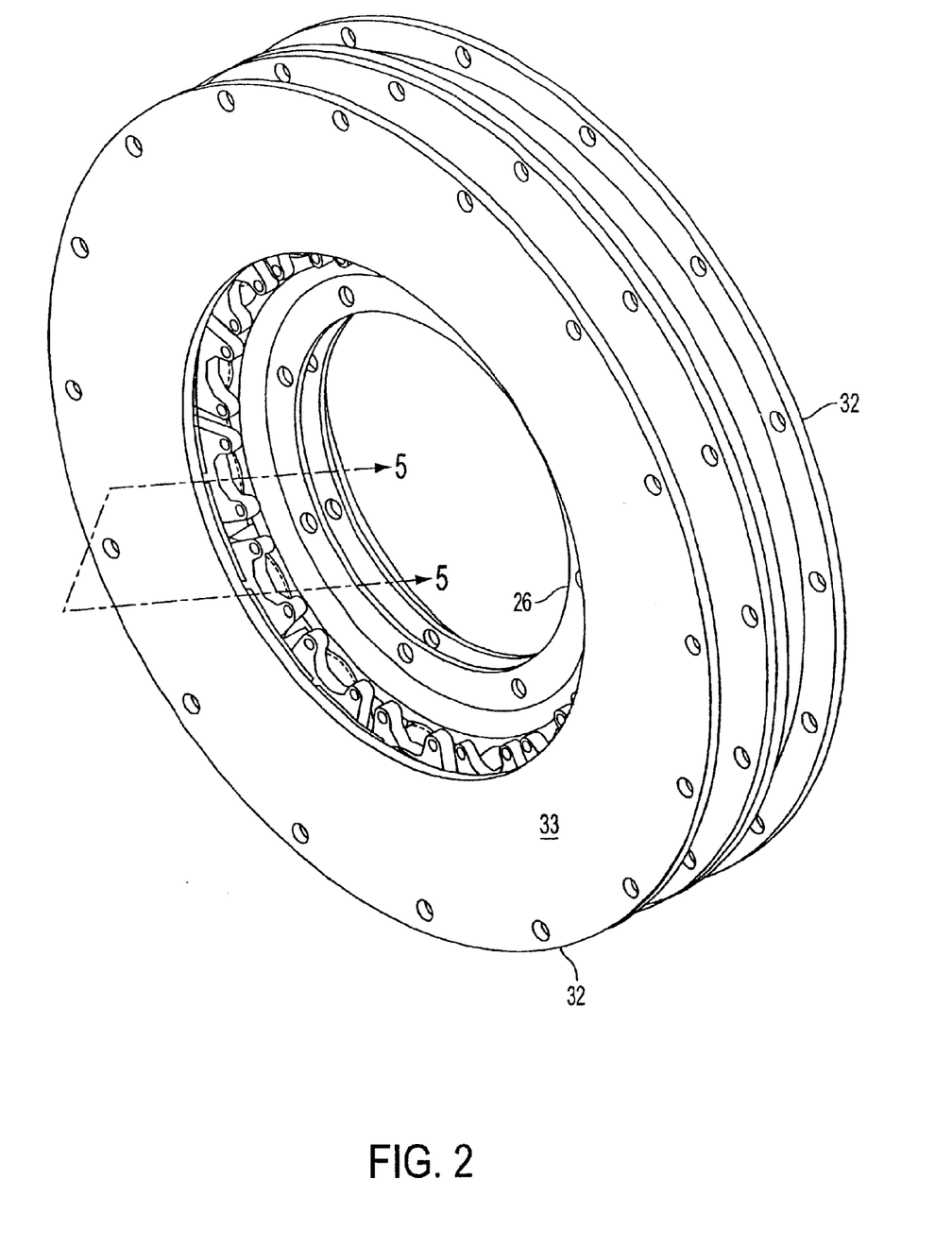
FIG. 2 is a three-dimensional perspective view of the motor elements of FIG. 1 in an assembled state.

The stator and rotor rings are shown in their assembled state in the three-dimensional perspective view of FIG. 2. Each of the rotor end sections 32 has an outer end portion that is generally in the shape of an annular disk, having inner and outer diameters, and coaxial with the axis of rotation. The outer end portion extends beyond the outer diameter of a tubular edge member, to which it is attached, by a flange portion. A similar flange extends from the inner axial side of the tubular edge member of each rotor end portion. Both flanges have through holes distributed near their peripheries. The through holes of the inner surface flanges are in alignment for attachment of the end portions to each other by any conventional means, the edge members thereby forming a cross portion of a U-shaped cross section. The through holes of the outer flanges enable attachment of the rotor ring to plates, not shown, to be coupled with a shaft at the axis of rotation.

Figure 3:
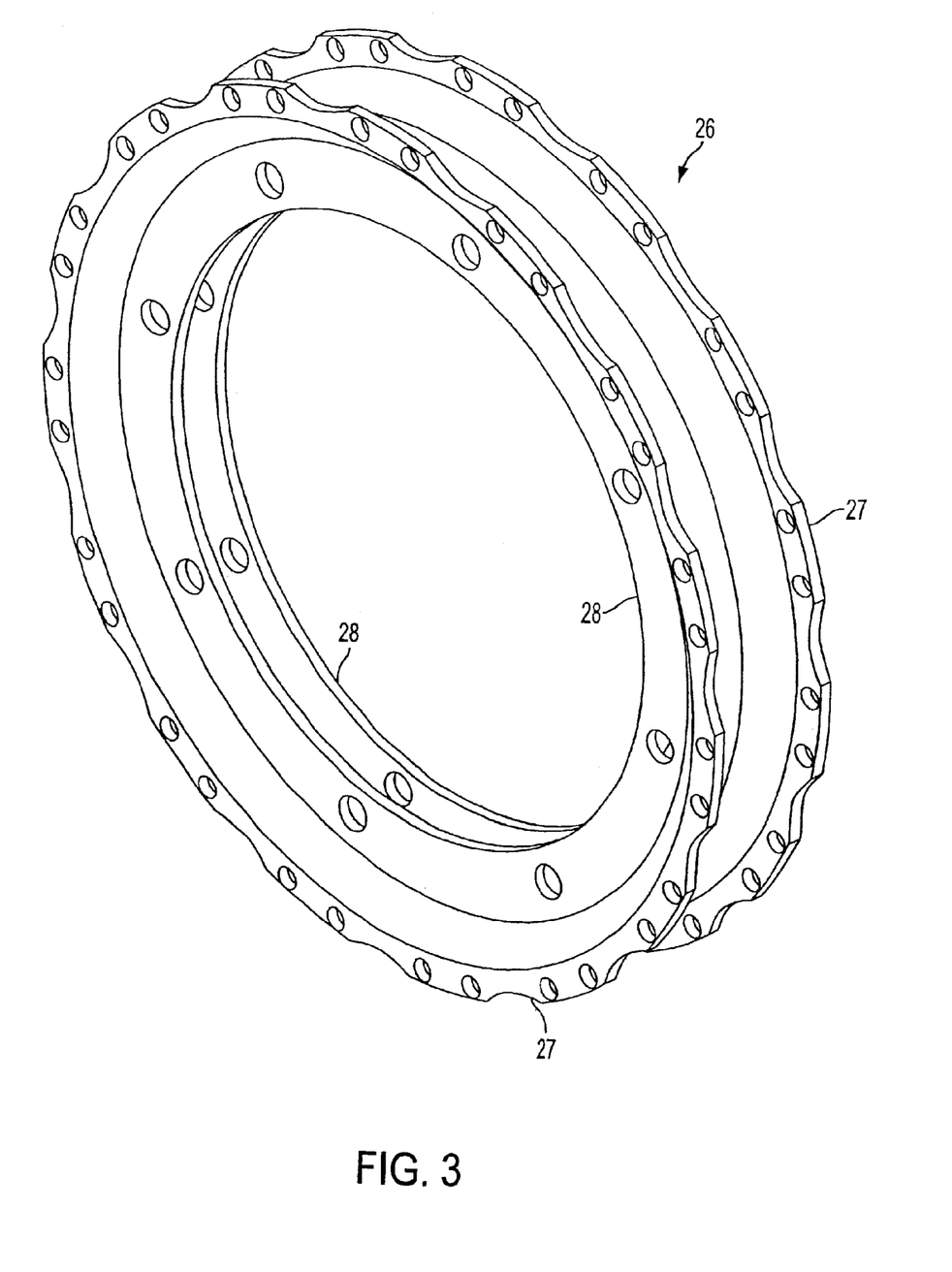
FIG. 3 is a three-dimensional perspective view of stator ring support structure for the arrangement of FIG. 2.

The stator support ring 26, shown in the three-dimensional perspective view of FIG. 3., is an axially disposed cylinder having at each end an upper perpendicular flange 27 and a lower perpendicular flange 28. Upper flange 27 has regularly spaced protrusions that contain a pair of through holes. The axial spacing between flanges 27 is set to accommodate the stator electromagnet core elements 22. Lower flange 28, which has a generally circular periphery, has through holes that are used for mounting the ring to an appropriate stationary support structure. The number and location of the through holes in flange 28 can be adjusted to coordinate with a mounting arrangement for attachment thereto in a conventional manner.

Figure 4:
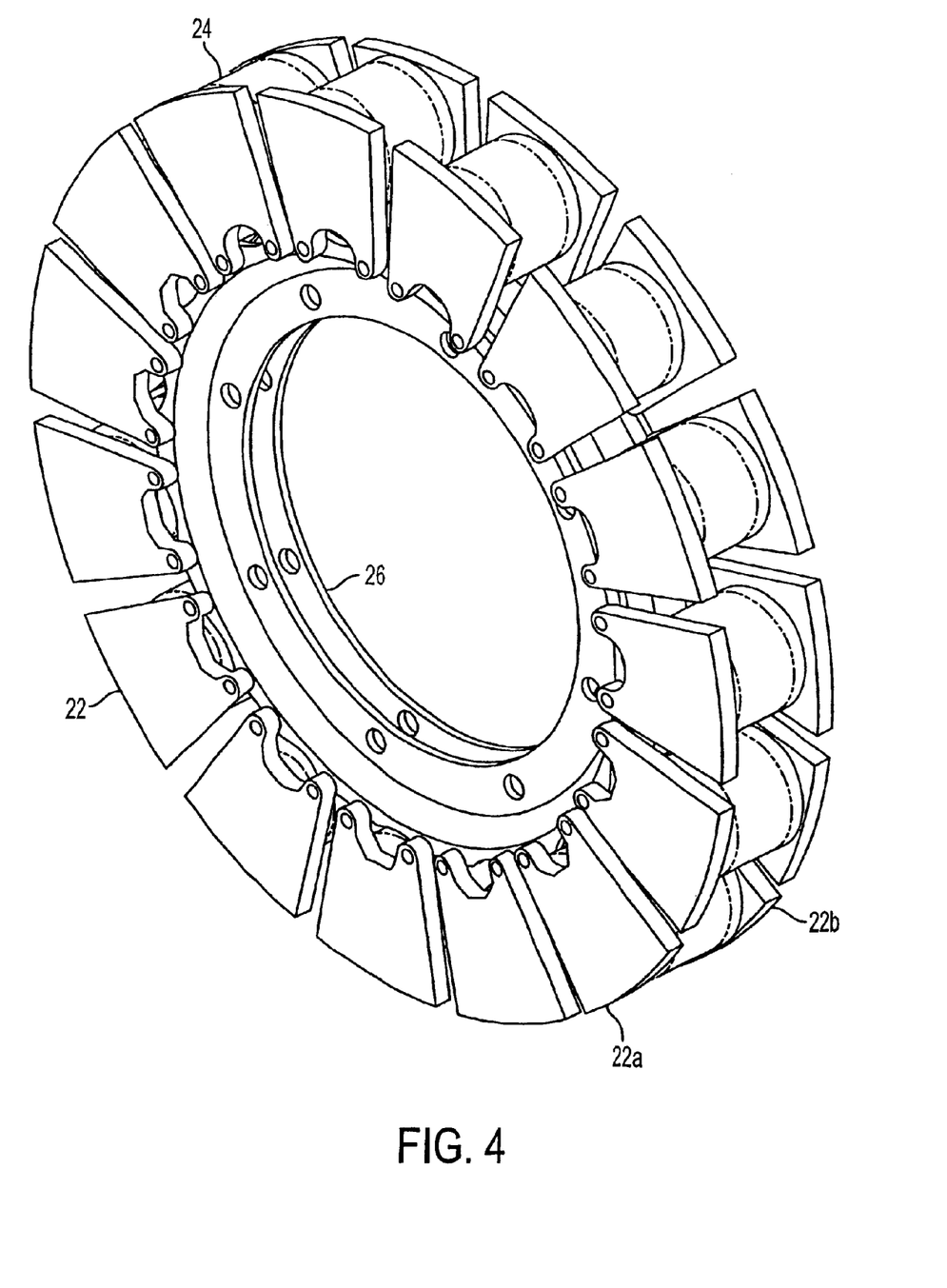
FIG. 4 is a three-dimensional perspective view of the stator core elements in combination with the support structure of the present invention.

As shown in FIG. 4, each of the stator electromagnet core elements is configured with an axially aligned pole pair 22a and 22b, having pole faces that lie substantially in radial planes. Through holes are provided at the base of each pole for alignment with the through holes in the flanges 27 of ring 26. Each core element is mounted via the through holes at the base of the poles to an aligned protrusion on each of the flanges 27. The electromagnet elements are separated from direct contact with each other. Ring 26 is formed of non-ferromagnetic material, such as aluminum or stainless steel. In operation, each electromagnet thus forms a flux path that is independent and isolated from the flux paths of other electromagnets.

In the preferred implementation, the stator is joined to a stationary shaft. The rotor, which at least partially surrounds the stator, is coupled to the shaft through appropriate interconnecting structure and bearings. It is within the contemplation of the invention, however, that the shaft instead may be fixed to the rotor and, therefore, rotatable. In the latter arrangement the shaft would be coupled to the stator supporting structure through bearings.

Figure 5:
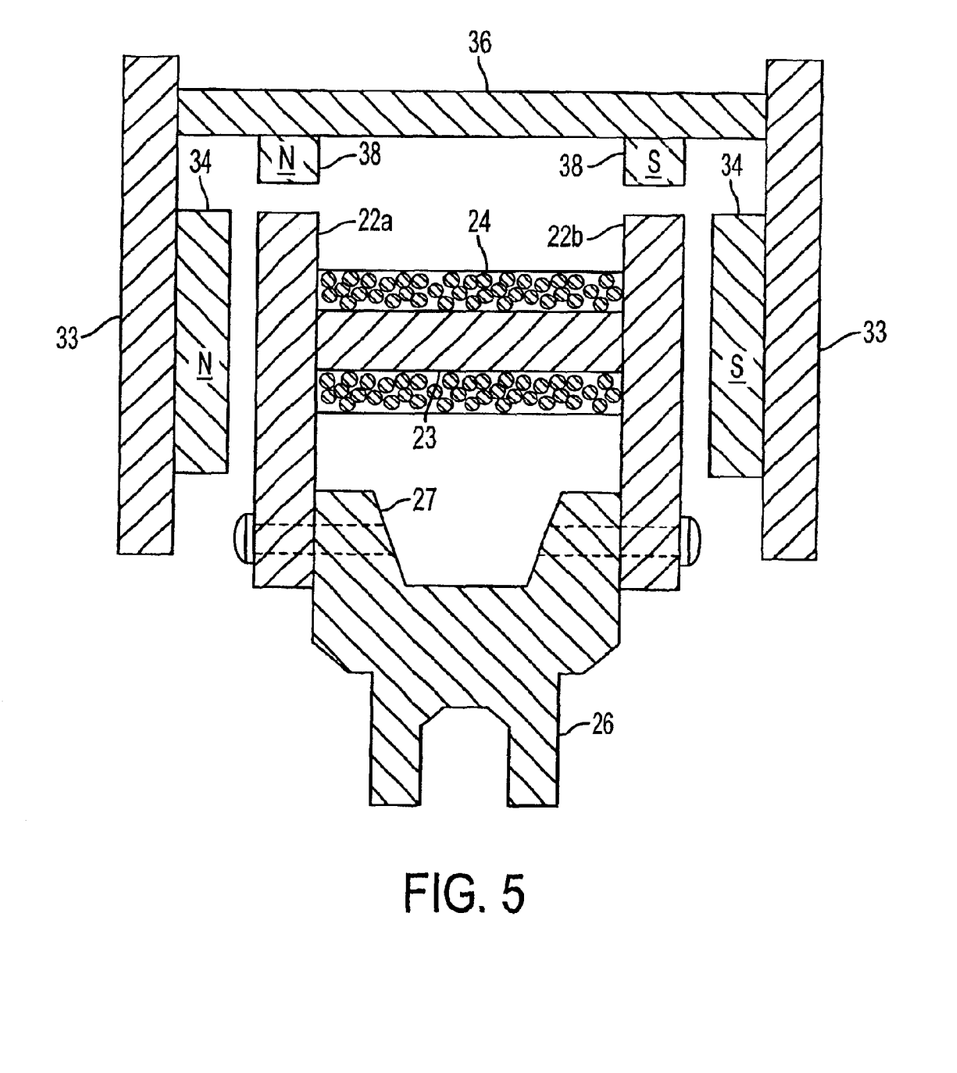
FIG. 5 is a cross section taken along dotted line plane 3—3 of FIG. 2.

FIG. 5 is a cross-sectional view, represented diagrammatically, of the stator and rotor rings taken at the plane along the dotted-line 5—5 of FIG. 2. Seen in cross-section, the rotor ring 32 has side portions 33 that are connected by cross portion 36. At least the side portions are fabricated of ferromagnetic material that forms a "back iron" upon which permanent magnets 34 are mounted, distributed in a manner as shown in FIG. 1. The magnets are relatively thin dipole magnets having substantially planar pole faces. The entirety of each pole face exhibits a single magnetic polarity, opposite to the polarity at the back surface of the magnet. Adjacent magnets successively alternate in magnetic polarity along the side portion ring. The magnets on the opposing side portions are in alignment with each other and have opposite magnetic polarities.

Stator electromagnet 22 has a generally H-shaped cross-section of ferromagnetic material. Winding 24 is formed on a linking portion 23 that joins the two poles 22a and 22b. The stator pole faces are substantially parallel to the rotor magnet pole faces. Two axial air gaps are thus formed between the stator and rotor pole faces. In operation, energization of winding 24 is appropriately switched to magnetize the pole pair with opposite magnetic polarities. Flux paths are thereby generated across the air gaps to produce magnetomotive force. Reference is made to the aforementioned copending applications for description of appropriate switching control means. The configuration of FIG. 5 provides a large air gap surface area in which torque producing flux can be focused, while minimizing the structural volume of the motor. Ferromagnetic isolation of the stator electromagnets minimizes stray flux losses and fringing.

Figure 6:
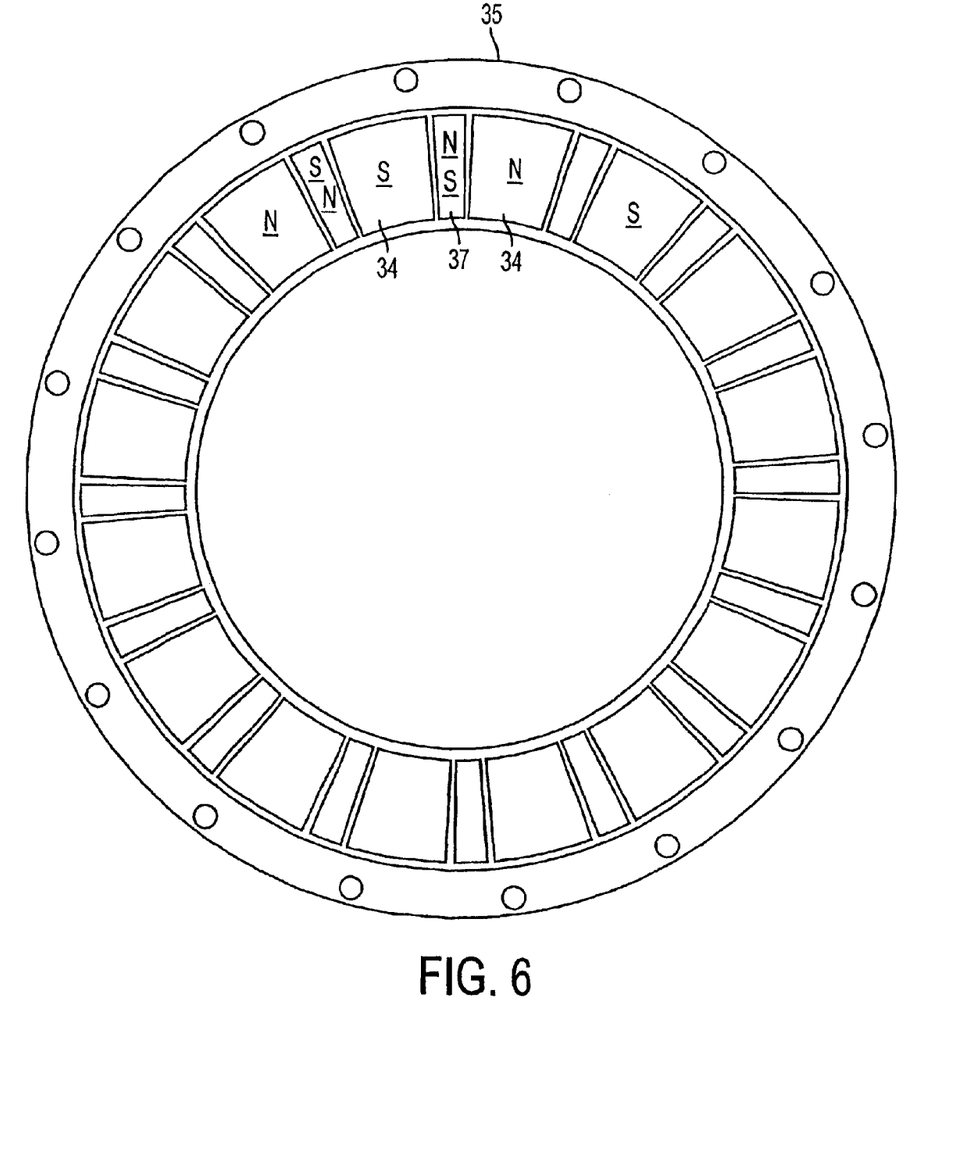
FIG. 6 is a plan view of a rotor side portion in accordance with the present invention.

FIG. 6 is a plan view of a rotor side portion that illustrates a further variation of the rotor side portion permanent magnet distribution. Additional permanent magnets 37 are located in the spaces between adjacent magnets 34. Magnets have magnetic polar orientation in the radial plane. This arrangement provides a more focused flux distribution. Reference is made to copending application, Ser. No. 09/966,101, mentioned earlier, for description and illustration of specific flux distribution paths obtained from the use of flux focusing magnets.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein.

What is claimed is:

1. A rotary electric motor comprising:
a rotor disposed in an annular ring configuration about an axis of rotation and comprising a plurality of permanent magnet elements; and
a stator comprising a plurality of separated electromagnet core segments disposed coaxially about the axis of rotation to form an annular stator ring bounded by an inner and outer diameter;
wherein the annular rotor ring at least partially surrounds the annular stator to define two axial air gaps between the rotor and stator respectively on opposite axial sides of the stator.

2. A rotary electric motor as recited in claim 1, wherein each stator electromagnet core segment comprises a pair of poles aligned in a direction generally parallel to the axis of rotation, the poles having respective pole faces generally perpendicular to the axis of rotation.

3. A rotary electric motor as recited in claim 2, wherein the pole pair of each core segment is joined by a ferromagnetic linking portion having a winding formed thereon to develop, when energized with current, magnetic poles of opposite polarity in the pole pair, and wherein reversal of direction of current flow through the winding effects reversal of magnetic polarities of the pole pair.

4. A rotary electric motor as recited in claim 2, wherein the rotor annular ring has a U-shaped cross section with two side portions formed of ferromagnetic material connected by a cross portion, an inner surface of each of the side portions having mounted thereon a plurality of permanent magnets distributed along the surface and facing the respective axial air gap, the cross portion being radially separated from the outer diameter of the stator.

5. A rotary electric motor as recited in claim 4, wherein the plurality of permanent magnets successively alternate in polarity along the rotor ring.

6. A rotary electric motor as recited in claim 5, wherein the number of permanent magnets on the two side portions are equal to each other and are respectively in axial alignment with each other, the axially aligned permanent magnets being of opposite magnetic polarity.

7. A rotary electric motor as recited in claim 5, wherein the rotor permanent magnets on each side portion are separated from contact with each other, and
each permanent magnet is a magnetic dipole having one magnetic polarity at a surface at the air gap and the opposite magnetic polarity at a surface opposite from the air gap, thereby forming a magnetic polar orientation in the axial direction.

8. A rotary electric motor comprising:
a rotor disposed in an annular ring configuration about an axis of rotation and comprising a plurality of permanent magnet elements that successively alternate in polarity along the rotor ring; and
a stator comprising a plurality of separated electromagnet core segments disposed coaxially about the axis of rotation to form an annular stator ring bounded by an inner and outer diameter, each stator electromagnet core segment comprising a pair of poles aligned in a direction generally parallel to the axis of rotation, the poles having respective pole faces generally perpendicular to the axis of rotation;
wherein the annular rotor ring at least partially surrounds the annular stator to define two axial air gaps between the rotor and stator respectively on opposite axial sides of the stator, the rotor annular ring having a U-shaped cross section with two side portions formed of ferromagnetic material connected by a cross portion, an inner surface of each of the side portions having mounted thereon a plurality of permanent magnets distributed along the surface and facing the respective axial air gap, the cross portion being radially separated from the outer diameter of the stator, and the number of permanent magnets on the two side portions are equal to each other and are respectively in axial alignment with each other, the axially aligned permanent magnets being of opposite magnetic polarity;
the rotor permanent magnets on each side portion are separated from contact with each other;
each permanent magnet is a magnetic dipole having one magnetic polarity at a surface at the air gap and the opposite magnetic polarity at a surface opposite from the air gap thereby forming a magnetic polar orientation in the axial direction; and
additional permanent magnets, having magnetic polar orientations in directions perpendicular to the axial direction are mounted on the side portions in the spaces separating adjacent the dipole permanent magnets.

9. A rotary electric motor as recited in claim 3, wherein the stator further comprises a non-ferromagnetic support structure to which the core segments are affixed without ferromagnetic contact with each other.

10. A rotary electric motor as recited in claim 4, wherein the rotor cross portion is formed of non-ferromagnetic material.

11. A rotary electric motor as recited in claim 1, wherein said axial air gaps are substantially parallel to each other.

12. A rotor for a rotary electric motor comprising:

an annular ring, concentric with an axis of motor rotation, having a U-shaped cross section comprising side portions connected by a cross portion;

a plurality of permanent magnets distributed along an inner surface of each of the side portions and facing in the axial direction to form at least one axial air gap;

and wherein:

the cross portion has an inner surface facing in a radial direction;

each side portion is formed of ferromagnetic material;

the permanent magnets at each side portion inner surface are separated from contact with each other;

each permanent magnet is a magnetic dipole having one magnetic polarity at the surface of the side portion and the opposite magnetic polarity at a surface of the permanent magnet axially opposite from side portion surface; and additional permanent magnets are mounted on the side portions in spaces separating adjacent dipole magnets, said additional permanent magnets having magnetic polar orientations in a plane perpendicular to the axis.

* * * * *